(12) United States Patent
Huang et al.

(10) Patent No.: US 9,168,623 B2
(45) Date of Patent: Oct. 27, 2015

(54) BIAXIAL LINEAR-MOTION MICRO DRIVE APPARATUS

(75) Inventors: Yumei Huang, Shaanxi (CN); Hongyan Liu, Shaanxi (CN); Xingang Yang, Shaanxi (CN); Yong Yang, Shaanxi (CN)

(73) Assignee: XI'AN UNIVERSITY OF TECHNOLOGY, Xi'an Shaanxi (CN)

( * ) Notice: Subject to any disclaimer, the term of this patent is extended or adjusted under 35 U.S.C. 154(b) by 254 days.

(21) Appl. No.: 13/989,850

(22) PCT Filed: Oct. 13, 2011

(86) PCT No.: PCT/CN2011/080762
§ 371 (c)(1),
(2), (4) Date: Aug. 1, 2013

(87) PCT Pub. No.: WO2012/068927
PCT Pub. Date: May 31, 2012

(65) Prior Publication Data
US 2014/0053670 A1    Feb. 27, 2014

(30) Foreign Application Priority Data
Nov. 25, 2010    (CN) .......................... 2010 1 0559119

(51) Int. Cl.
*G05G 11/00* (2006.01)
*B23Q 5/22* (2006.01)
*B23Q 5/28* (2006.01)

(52) U.S. Cl.
CPC .. *B23Q 5/22* (2013.01); *B23Q 5/28* (2013.01); *B23Q 2210/002* (2013.01); *Y10T 74/18992* (2015.01)

(58) Field of Classification Search
CPC ....... B23Q 5/22; B23Q 5/28; B23Q 2210/002
USPC ............ 74/490.09; 310/12.01, 12.05, 323.02, 310/323.17, 328
See application file for complete search history.

(56) References Cited

U.S. PATENT DOCUMENTS 7,157,722 B2 *    1/2007    Shibata .................... 250/442.11
7,508,111 B2 *    3/2009    Ko et al. ........................ 310/309
(Continued)

FOREIGN PATENT DOCUMENTS

CN    2670902        1/2005
CN    101474758      7/2009
(Continued)

OTHER PUBLICATIONS

International Search Report for PCT/CN2011/080762, English translation attached to original, Both completed by the Chinese Patent Office on Dec. 12, 2011, All together 6 Pages.

*Primary Examiner* — William Kelleher
*Assistant Examiner* — Zakaria Elahmadi
(74) *Attorney, Agent, or Firm* — Brooks Kushman P.C.

(57) ABSTRACT

A biaxial linear-motion micro drive apparatus includes: a mounting base A on an upper surface of a Z-direction sliding base; a Z-direction micro actuator fixed within the mounting base A and connected with a Z-direction micro-motion platform connected with an X-direction sliding base; Z-direction guide rail strips arranged on the Z-direction sliding; two Z-direction guide rail blocks provided on one Z-direction guide rail strip fixedly mounted on a lower surface of the X-direction sliding base; a mounting base B provided on an upper surface of the X-direction sliding base; an X-direction micro actuator in the mounting base B and connected with an X-direction micro-motion platform connected with an XZ biaxial motion platform; two X-direction guide rail strips arranged on the upper surface of the X-direction sliding base; two X-direction guide rail blocks provided on each X-direction guide rail strip mounted on a lower surface of the XZ biaxial motion platform.

1 Claim, 2 Drawing Sheets

(56) References Cited

U.S. PATENT DOCUMENTS

| | | | |
|---|---|---|---|
| 8,387,482 B2* | 3/2013 | Choi et al. | 74/490.09 |
| 8,517,363 B2* | 8/2013 | Makino et al. | 269/73 |
| 2002/0020069 A1* | 2/2002 | Bottinelli et al. | 33/1 M |
| 2003/0132671 A1* | 7/2003 | Gweon et al. | 310/12 |
| 2005/0229737 A1* | 10/2005 | Tsuno et al. | 74/490.09 |
| 2005/0258713 A1* | 11/2005 | Lubitz et al. | 310/328 |
| 2005/0269915 A1 | 12/2005 | Pan et al. | |
| 2007/0295140 A1* | 12/2007 | Fujita et al. | 74/490.09 |
| 2010/0250004 A1 | 9/2010 | Makino et al. | |
| 2011/0188104 A1* | 8/2011 | Tachibana et al. | 359/199.2 |
| 2012/0139366 A1* | 6/2012 | Yman et al. | 310/12.29 |

FOREIGN PATENT DOCUMENTS

| | | |
|---|---|---|
| CN | 102059576 | 5/2011 |
| JP | 2010219390 | 9/2010 |

* cited by examiner

BIAXIAL LINEAR-MOTION MICRO DRIVE APPARATUS

CROSS-REFERENCE TO RELATED APPLICATION

This application is the U.S. national phase of PCT Application No. PCT/CN2011/080762 filed on Oct. 13, 2011, which claims priority to Chinese Patent Application No. 201010559119.4 filed on Nov. 25, 2010, the disclosures of which are incorporated in their entirety by reference herein.

BACKGROUND

1. Technical Field

The present disclosure belongs to the technical field of precision numerical control machine tool, and applies to a precision linear feeding mechanism of an end effector capable of enduring a large load and mounting tools or workpieces. More particularly, the present disclosure relates to a biaxial linear-motion micro drive apparatus.

2. Background Art

With the development of science and technology, a demand for ultra-precision machining accuracy has tended to nanometer scale, and thus a precision and ultra-precision numerical control machine tool at the micron scale, submicron scale and nanometer scale has become one of important developing directions of advanced numerical control machine tools. Machine tool feeding system is one of key factors affecting the overall performance of the machine tool. Performance of the machine tool feeding system is affected greatly by drive, transmission and guide mechanisms. One of effective ways of improving the feeding accuracy of the ultra-precision machining machine tool is to employ the combination of a macro drive and a micro drive, in which machining size and profile are achieved by the macro drive and error compensation in size and profile is carried out by the micro drive, thereby meeting a demand for ultra-precision machining.

Combination of the macro drive and the micro drive in the existing linear feeding motion includes two manners: one manner is that the macro drive and the micro drive are in series directly, that is, a macro feeding of each feeding axis is achieved by driving a macro motion sliding platform through the macro drive, and a micro feeding thereof is achieved by driving a micro motion sliding platform using a micro actuator mounted on the macro motion sliding platform, for example, a machine tool requiring a macro drive and a micro drive in X-axis and Z-axis may employ such a manner in which an X feeding axis is achieved by making the macro drive and the micro drive in X-axis be in series directly and a Z feeding axis is achieved by making the macro drive and the micro drive in Z-axis be in series directly; the other manner is that a macro drive mechanism and a micro drive mechanism are separated from each other, the micro drive mechanism may be designed as an independent part and mounted in any other position, for example, a machine tool requiring a macro drive and a micro drive in X-axis and Z-axis may employ such a manner in which macro drives in X-axis and Z-axis are provided separately and micro drives in X-axis and Z-axis are designed to be independent X-axis and Z-axis micro drive parts.

SUMMARY

Technical Problem

An object of the present invention is to provide a biaxial linear-motion micro drive apparatus, which combines micro drive mechanisms of two motion axes into one organically, thereby meeting the demand of a precision and ultra-precision numerical control machine tool having a large scale and enduring a large load.

Technical Solution

The technical solution employed by the present invention is a biaxial linear-motion micro drive apparatus including: a Z-direction sliding base; a raised mounting base A provided on the center of an upper surface of the Z-direction sliding base; a Z-direction micro actuator fixedly mounted within the mounting base A and in transmission connection with a Z-direction micro motion platform, the Z-direction micro motion platform being fixedly connected with an X-direction sliding base upwardly; Z-direction guide rail strips arranged in parallel on the Z-direction sliding base at both sides of the mounting base A; two Z-direction guide rail blocks correspondingly provided on one Z-direction guide rail strip at each side, four Z-direction guide rail blocks being fixedly mounted on a lower surface of the X-direction sliding base; a raised mounting base B provided on the center of an upper surface of the X-direction sliding base; an X-direction micro actuator fixedly mounted at an inner side of the mounting base B and in transmission connection with an X-direction micro motion platform, the X-direction micro motion platform being fixedly connected with an XZ biaxial motion platform upwardly; two X-direction guide rail strips arranged on the upper surface of the X-direction sliding base at both sides of the mounting base B; two X-direction guide rail blocks correspondingly provided on each X-direction guide rail strip, four X-direction guide rail blocks being fixedly mounted on a lower surface of the XZ biaxial motion platform.

The present invention is also characterized in that: the X-direction micro motion platform and the mounting base B on the X-direction sliding base are connected by several groups of X-direction flexible hinges; the Z-direction micro motion platform and the mounting base A on the Z-direction sliding base are connected by several groups of Z-direction flexible hinges.

Advantageous Effect

The advantageous effect of the present invention is in that: 1) Micro drive in two feeding directions can be achieved, the biaxial motion platform thereof can be provided close to an end effector on the machine tool for mounting tools or workpieces, the error propagation is small and the feeding precision is high; 2) X-direction guide rail pairs are symmetrical relative to the X-direction micro actuator in up and down, left and right and front and rear, Z-direction guide rail pairs are symmetrical relative to the Z-direction micro actuator in up and down, left and right and front and rear, and thus the actuators can be prevented from enduring the transverse force and moment; 3) four X-direction flexible hinges together with four Z-direction flexible hinges compensate attitude errors of XZ biaxial motion platform, and thus the guide accuracy is high. The principle of the biaxial linear-motion micro drive apparatus according to the present invention is also applicable to a monaxial linear-motion micro drive functional part provided independently so as to adapt the need of monaxial error compensation being carried out only through micro drive.

REFERENCE NUMERALS IN THE DRAWINGS

Figure 1:
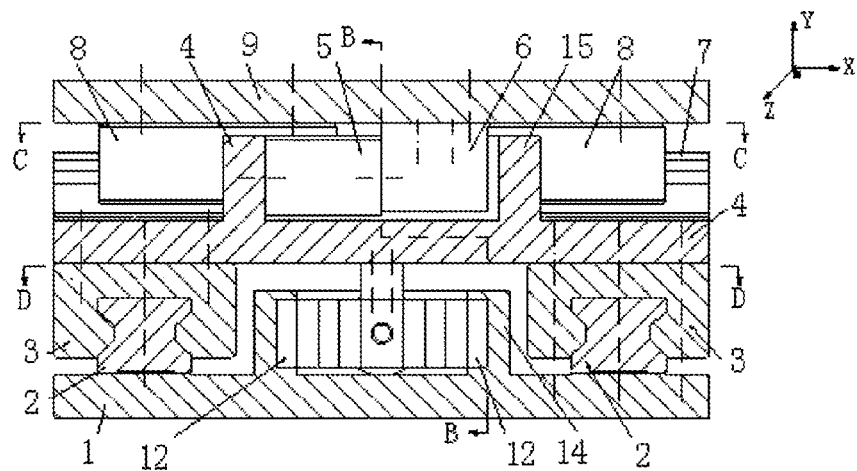
FIG. 1 is a schematic view of structure of the apparatus according to an exemplary embodiment of the present invention.

1 Z-direction sliding base
2 Z-direction guide rail strip
3 Z-direction guide rail block
4 X-direction sliding base
5 X-direction micro actuator
6 X-direction micro motion platform
7 X-direction guide rail strip
8 X-direction guide rail block
9 XZ biaxial motion platform
10 X-direction flexible hinge
11 Z-direction micro motion platform
12 Z-direction flexible hinge
13 Z-direction micro actuator
14 mounting base A
15 mounting base B

DETAILED DESCRIPTION OF EXEMPLARY EMBODIMENTS

The present invention is described in detail below in conjunction with the detailed description and the attached drawings.

The reference coordinate system is shown in FIG. 1. As illustrated in FIG. 1 and FIG. 3, the structure of the apparatus according to an exemplary embodiment of the present invention includes a Z-direction sliding base 1; a raised mounting base A 14 having a rectangular shape and provided on the center of an upper surface of the Z-direction sliding base 1; a Z-direction micro actuator 13 fixedly mounted at an inner side of the mounting base A 14 and in transmission connection with a Z-direction micro motion platform 11 horizontally, the Z-direction micro motion platform 11 being fixedly connected with an X-direction sliding base 4 upwardly; Z-direction guide rail strips 2 arranged in parallel on the upper surface of the Z-direction sliding base 1 at both sides of the mounting base A 14; two Z-direction guide rail blocks 3 correspondingly provided on one Z-direction guide rail strip 2 at each side (referring to FIG. 4), four Z-direction guide rail blocks 3 being fixedly mounted on a lower surface of the X-direction sliding base 4 upwardly; a raised mounting base B 15 having a rectangular shape and provided on the center of an upper surface of the X-direction sliding base 4 similarly; an X-direction micro actuator 5 fixedly mounted at an inner side of the mounting base B 15 and in transmission connection with an X-direction micro motion platform 6 horizontally, the X-direction micro motion platform 6 being fixedly connected with an XZ biaxial motion platform 9 upwardly; two X-direction guide rail strips 7 provided on the upper surface of the X-direction sliding base 4 at both sides of the mounting base B 15; two X-direction guide rail blocks 8 correspondingly provided on each X-direction guide rail strip 7 (referring to FIG. 2), four X-direction guide rail blocks 8 being fixedly mounted on a lower surface of the XZ biaxial motion platform 9 upwardly.

Figure 2:
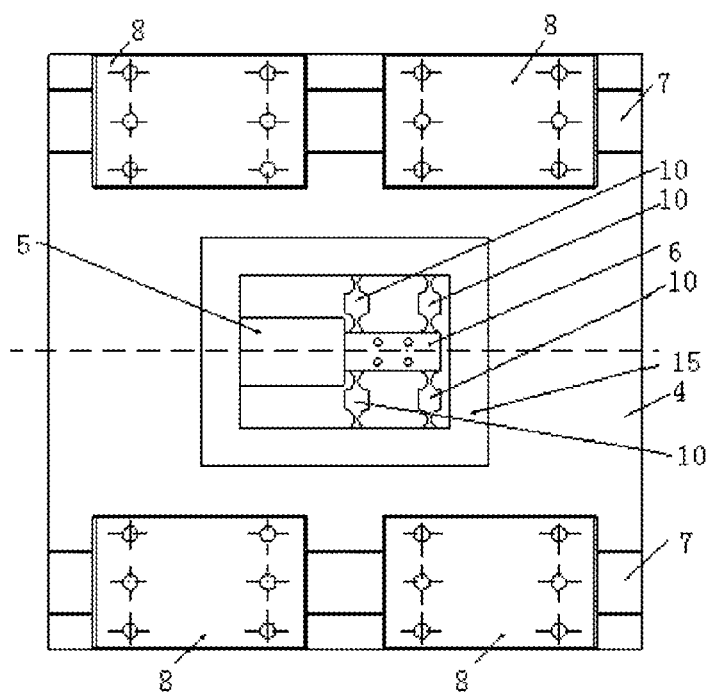
FIG. 2 is a schematic sectional view taken along line C-C in FIG. 1.
Figure 3:
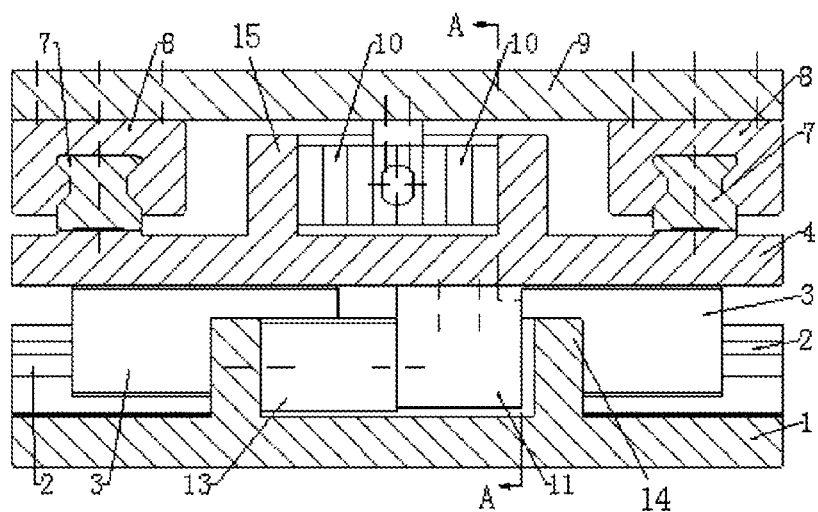
FIG. 3 is a schematic sectional view taken along line B-B in FIG. 1.
Figure 4:
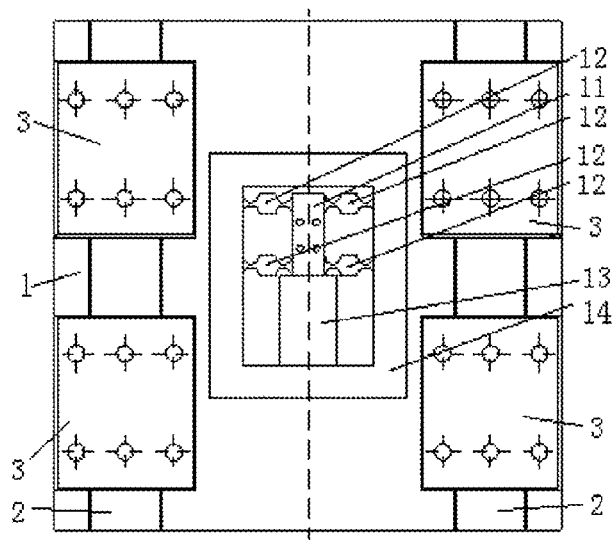
FIG. 4 is a schematic sectional view taken along line D-D in FIG. 1.

As illustrated in FIG. 2, the X-direction micro motion platform 6 and the mounting base B 15 on the X-direction sliding base 4 are connected by several groups of X-direction flexible hinges 10. As illustrated in FIG. 4, the Z-direction micro motion platform 11 and the mounting base A 14 on the Z-direction sliding base 1 are connected by several groups of Z-direction flexible hinges 12.

FIG. 1 is a schematic sectional view taken along line A-A in FIG. 3. Referring to FIGS. 1-2, one end of the X-direction micro actuator 5 is fixedly connected with the mounting base B 15 on the X-direction sliding base 4, and the other end of the X-direction micro actuator 5 is fixedly connected with the X-direction micro motion platform 6. The X-direction micro motion platform 6 has four X-direction flexible hinges 10 mounted symmetrically in front and rear thereof (that is, in Z-direction, see FIG. 2), the other ends of the X-direction flexible hinges 10 are fixedly connected with the mounting base B 15 on the X-direction sliding base 4, the top of the X-direction micro motion platform 6 is fixedly connected with the XZ biaxial motion platform 9, and the X-direction micro motion platform 6 is driven by the micro extend-retract of the X-direction micro actuator 5 to perform micro motion along X-direction, such that the XZ biaxial motion platform 9 is driven to perform micro motion along X-direction. Guide rail strips 7 of two X-direction guide rail pairs are fixedly mounted at both sides of the X-direction sliding base 4 symmetrically in front and rear (that is, in Z-direction) and in up and down (that is, in Y-direction) relative to the X-direction micro actuator 5, four guide rail blocks 8 of X-direction guide rail pairs are fixedly mounted at both sides of the XZ biaxial motion platform 9 symmetrically in front and rear at positions corresponding to two X-direction guide rail strips 7, each X-direction guide rail strip 7 is connected with two X-direction guide rail blocks 8 respectively so as to constitute X-direction guide rail pairs, and two X-direction guide rail blocks 8 of each guide rail pair are symmetrical in left and right (that is, in X-direction) relative to a connection surface of the X-direction micro actuator 5 and the X-direction micro motion platform 6.

Referring to FIGS. 3-4, one end of the Z-direction micro actuator 13 is fixedly connected with the mounting base A 14 on the Z-direction sliding base 1, and the other end of the Z-direction micro actuator 13 is fixedly connected with the Z-direction micro motion platform 11. The Z-direction micro motion platform 11 has four Z-direction flexible hinges 12 mounted symmetrically in front and rear thereof (that is, in Z-direction, see FIG. 4), the other ends of the Z-direction flexible hinges 12 are fixedly connected with the mounting base A 14 on the Z-direction sliding base 1, the top of the Z-direction micro motion platform 11 is fixedly connected with the X-direction sliding base 4, and the Z-direction micro motion platform 11 is driven by the micro extend-retract of the Z-direction micro actuator 13 to perform micro motion along Z-direction, such that the XZ biaxial motion platform 9 is driven by the X-direction sliding base 4 and the X-direction guide rail pairs to perform micro motion along Z-direction. Guide rail strips 2 of two Z-direction guide rail pairs are fixedly mounted at both sides of the Z-direction sliding base 1 symmetrically in left and right (that is, in X-direction) and in up and down (that is, in Y-direction) relative to the Z-direction micro actuator 13, four guide rail blocks 3 of Z-direction guide rail pairs are fixedly mounted at both sides of the X-direction sliding base 4 symmetrically in left and right at positions corresponding to two Z-direction guide rail strips 2, each Z-direction guide rail strip 2 is connected with two Z-direction guide rail blocks 3 respectively so as to constitute Z-direction guide rail pairs, and two Z-direction guide rail blocks 3 on each Z-direction guide rail strip are symmetrical in front and rear (that is, in Z-direction) relative to a connection surface of the Z-direction micro motion platform 11 and the Z-direction micro actuator 13.

The principle of the biaxial linear-motion micro drive apparatus according to the present invention can also be applicable to a monaxial linear-motion micro drive functional part provided independently, for example, the XZ biaxial motion platform 9 is modified into an X platform 9, and in this case, X axial linear-motion micro drive functional part can be constituted by the X-direction sliding base 4, the X-direction micro actuator 5, the X-direction micro motion platform 6, guide rail strips 7 of X-direction guide rail pairs, guide rail blocks 8 of X-direction guide rail pairs and the X platform 9.

What is claimed:

1. A biaxial linear-motion micro drive apparatus, comprising:
    a Z-direction sliding base (1);
    a raised mounting base A (14) provided on a center of an upper surface of the Z-direction sliding base (1);
    a Z-direction micro actuator (13) fixedly mounted within the mounting base A (14) and in transmission connection with a Z-direction micro motion platform (11), the Z-direction micro motion platform (11) being fixedly connected with an X-direction sliding base (4) upwardly;
    two Z-direction guide rail strips (2) arranged in parallel on the Z-direction sliding base (1) at both sides of the mounting base A (14);
    two Z-direction guide rail blocks (3) correspondingly provided on one Z-direction guide rail strip (2) at each side, four Z-direction guide rail blocks (3) being fixedly mounted on a lower surface of the X-direction sliding base (4);
    a raised mounting base B (15) provided on a center of an upper surface of the X-direction sliding base (4);
    an X-direction micro actuator (5) fixedly mounted at an inner side of the mounting base B (15) and in transmission connection with an X-direction micro motion platform (6), the X-direction micro motion platform (6) being fixedly connected with an XZ biaxial motion platform (9) upwardly;
    two X-direction guide rail strips (7) arranged on the upper surface of the X-direction sliding base (4) at both sides of the mounting base B (15); and
    four X-direction guide rail blocks (8), two of the X-direction guide rail blocks (8) correspondingly provided on each X-direction guide rail strip (7), with all four X-direction guide rail blocks (8) being fixedly mounted on a lower surface of the XZ biaxial motion platform (19);
    wherein;
        the two X-direction guide rail strips (7) are fixedly mounted at both sides of the X-direction sliding base (4) symmetrically in front and rear and in up and down relative to the X-direction micro actuator (5);
        the two Z-direction guide rail strips (2) are fixedly mounted at both sides of the Z-direction sliding base (1) symmetrically in left and right and in up and down relative to the Z-direction micro actuator (13),
        the X-direction micro motion platform (6) and the mounting base B (15) on the X-direction sliding base (4) are inter-connected by four X-direction flexible hinges (10) mounted symmetrically in front and rear of the X-direction micro motion platform (6) to enable limited movement of the X-direction micro motion platform in the X-direction; and
        the Z-direction micro motion platform (11) and the mounting base A (14) on the Z-direction sliding base (1) are inter-connected by four Z-direction flexible hinges (12) mounted symmetrically in front and rear of the Z-direction micro motion platform (11) to enable limited movement of the Z-direction micro motion platform in the Z-direction.

* * * * *